United States Patent [19]

Lee

[11] 4,300,080
[45] Nov. 10, 1981

[54] POWER DRIVER CONTROL CIRCUIT FOR SERVO ACTUATOR

[75] Inventor: Patrick S. Lee, Campbell, Calif.

[73] Assignee: Sperry Corporation, New York, N.Y.

[21] Appl. No.: 86,926

[22] Filed: Oct. 22, 1979

[51] Int. Cl.³ .............................................. G05B 9/02
[52] U.S. Cl. ................................. 318/563; 318/592; 318/624; 318/635; 318/674; 318/681
[58] Field of Search ............... 318/563, 592, 624, 635, 318/674, 681

[56] References Cited

U.S. PATENT DOCUMENTS

| | | | |
|---|---|---|---|
| 3,239,735 | 3/1966 | Raider et al. | 318/624 |
| 3,684,940 | 8/1972 | Lutz | 318/635 |
| 3,986,091 | 10/1976 | Quiogue et al. | 318/681 |
| 4,066,945 | 1/1978 | Korte, Jr. | 318/681 |

Primary Examiner—J. V. Truhe
Assistant Examiner—Eugene S. Indyk
Attorney, Agent, or Firm—Thomas Schneck, Jr.; Eugene T. Battjer; William E. Cleaver

[57] ABSTRACT

A power driver control circuit (38) provides control signals (44, 46, 48, 50, 52, 54) for switching transistors in a power driver (56) for an electromagnetic actuator (11) of the type used for controlling a servo head (12) in a closed loop servo system. The control circuit includes variable time delay circuits (70, 71) connected to threshold detectors (74, 84) so that dead zones can be created when the servo error signal changes polarity thereby isolating the switches and preventing switch burn-out.

30 Claims, 21 Drawing Figures

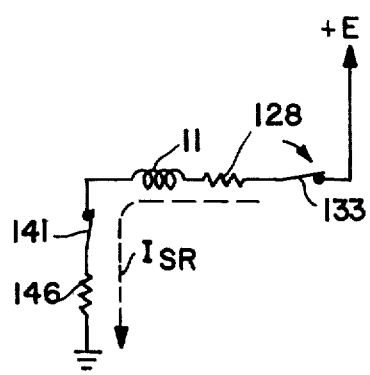
_Fig.9e_
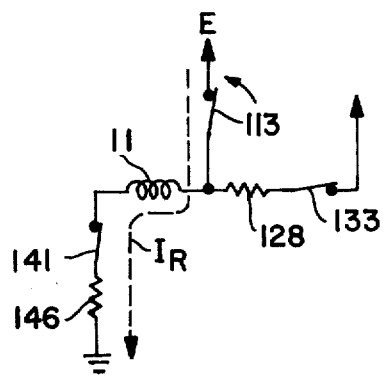
_Fig.9f_
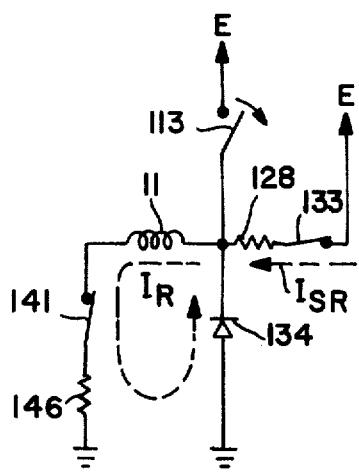
_Fig.9g_
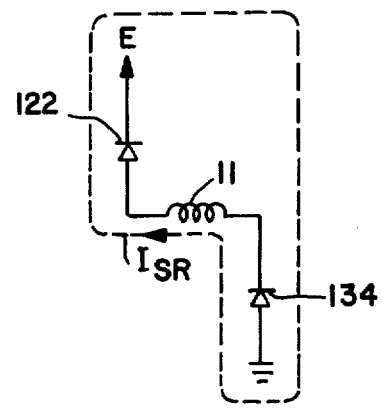
_Fig.9h_

POWER DRIVER CONTROL CIRCUIT FOR SERVO ACTUATOR

BACKGROUND OF THE INVENTION a. Field of the Invention

The invention relates to servo systems having electromagnetic actuators for moving and positioning transducers or the like, and in particular to an improved control circuit for a power driver used with such actuators.

b. Prior Art

Electromagnetic actuators are used in electronic closed loop servo systems to position a movable member, such as a read-write magnetic head, to a desired location. In random access data storage and retrieval applications involving rotating magnetic disks, such servo systems operate in two modes: a track seeking or coarse mode and a track following or fine mode. An example of the manner of operation of a servo system in the track seeking mode is found in U.S. Pat. No. 4,027,338, issued May 31, 1977 to R. Kril for Transducer Positioning System for Providing Coarse Positioning, while an example of the manner of operation of a servo system in the fine mode is found in U.S. Pat. No. 3,864,740, issued Feb. 4, 1975 to F. Sordello and J. Cuda for Track Following Servo System. Inasmuch as signals indicative of servo error may be forward or reverse (positive or negative), the actuator must be able to respond to either type of error. A typical actuator is described in U.S. Pat. No. 3,737,969, issued June 12, 1973 to I. Pejcha for Centering Device, showing a current carrying coil disposed between poles of a permanent magnet. The current carrying coil is known as a linear induction motor, or simply a motor, and is also known as an electromagnetic actuator (EMA). The coil magnetically drives a carriage to which a servo head arm assembly and a number of read-write head arm assemblies are mounted. Forward current initially applied to the coil accelerates the carriage forward and reverse current applied thereafter decelerates the forward motion. Conversely, reverse current initially applied to the coil accelerates the carriage backward and forward curent applied thereafter decelerates the backward motion.

Because of the requirement to provide the EMA with forward and reverse current, a bridge circuit of transistor switches, as shown in FIG. 1, has been provided as a convenient means of achieving the requirement. In this description of the bridge circuit, whenever any transistor switch is said to be on or closed, it means that the switching transistor is saturated with a negligible voltage drop between the collector and emitter of the transistor. On the other hand, whenever any transistor switch is said to be off or open, it means that the switching transistor is turned off and does not conduct. Coil 11 represents the entire EMA in this and the remaining figures and henceforth the coil will be termed the EMA. Transistor switches 13 and 15 form a pair of symmetrically opposed switches which are the lower arms of the bridge across the EMA. These switches, only one of which may be commanded to be open at a time, steer forward or reverse current through EMA 11. For example, when switch 13 is open and switch 15 is closed, forward current will flow through EMA 11. On the other hand, when switch 13 is closed and switch 15 is open, reverse current will flow through EMA 11. The switches 13 and 15 are supposed to change state simultaneously. Similarly, the transistor switches 17, 19 form a pair of symmetrically opposed switches which are a pair of upper arms for the electrical bridge to control the amount of current across EMA 11. The top of the bridge is connected to ground at node 21, while the bottom of the bridge is connected to a negative supply voltage at node 23. In parallel with each of the lower arms of the bridge are the diodes 23, 25, while in parallel with the upper arms of the bridge are the diodes 27, 29. Also arranged in parallel across upper arms of the bridge are the power resistors 31, 33, while a current sampling resistor 35 is placed in series with the EMA 11.

In the circuit of FIG. 1 it is important that the sequence of opening and closing switches is precisely controlled. For example, if switch 13 is not turned off before switch 17 at the same side of the bridge is turned on, a heavy current will flow from ground to the negative supply through switch 17 and switch 13 and is likely to burn out both of the switches in the process. In order to protect the integrity of the entire bridge, sequence control circuits 43, 45, 47 and 49 are provided. These sequence control circuits are analog control circuits which receive various commands to open switches in response thereto in a proper sequence. The driver switching sequence control circuits 43 and 45 respond to drive commands, reverse and forward respectively. The pulser switching sequence control circuits 47 and 49 respond to pulse commands, forward and reverse respectively. The sequence control circuits provide assurance that when one of the driver switches 13 or 15 is closed, the opposite member of the pair of driver switches forming the lower bridge arms is open, and simultaneously the pulser switch in the upper arm diagonally opposite to the closed drive switch in the lower arm is also closed, while the other pulser switch is open. Thus, if switch 13 is closed, switch 19 is also closed while switches 15 and 17 are both open. Because the switching speed of transistor switches is sometimes difficult to predict and control, there is a continuing problem of preventing switch burnout in the process of driving EMA 11.

Another problem with the power driver control circuit of FIG. 1 is that the two low resistance power resistors 31 and 33 which are included in the circuit to provide a certain constant current through the EMA during the fine mode of operation consume relatively large amounts of power in both coarse and fine modes of operation. In the case when a 48 volt supply is used as shown, each 100 ohm resistor would continuously consume 23 watts. Therefore high power resistors rated at tens of watts are required.

Still another problem with the power driver control circuit of FIG. 1 is that current flows through the current sensing resistor in both directions, therefore a complicated current sensing circuit 37 which generates a current sample through the current-to-voltage converter 39 is required. The complexity of the required circuit causes errors in the reported current sample, especially in reporting similar currents from one direction to the other, thereby adversely influencing servo control.

SUMMARY OF THE INVENTION

A principal object of the invention is to provide a control circuit for the transistor switches of a bridge controlling an EMA, as well as an improved bridge circuit which does not require sequence control circuits of the prior art, yet provides for safety of the switches against burnout. Another object of the invention is to provide a means for disconnecting the power resistors when not in use so as to reduce power dissipation. Yet another object of the invention is to sense the current through the EMA by means of unidirectional current sensing circuit.

The above objects have been met with an improved bridge circuit connected across the EMA whereby a first switching means which comprises a pair of symmetrically opposed switches in the upper arms of the bridge and another pair of symmetrically opposed switches in the lower arms applies first amount of forward and reverse power to the EMA during coarse servo corrections. A second switching means comprising a second pair of symmetrically opposed switches in parallel with the first pair of switches in the upper arms and the same switches in the lower arms provides second amount of forward and reverse power to the EMA during fine servo corrections, with the second amount of power being less than the first amount. Thus, independent sets of transistor switches form the upper arms of the bridge to provide corrective power for both coarse and fine modes of servo control of the EMA. By means of this approach, power resistors which are placed in series with the switches associated with fine servo corrections are not used during coarse servo corrections, thereby saving power.

A key feature of the present invention is found in the control circuit for the switches wherein a delay circuit with variable time constants is provided to receive the servo error signal and respond with a dead zone for turning off all switches for a pre-selected time upon transitions between forward and reverse servo errors. This provision of a dead zone obviates the requirement for precision sequence control circuits and allows any residual current in the EMA to decay through the circuit portions which bypass the transistor switches, whereby the safety of the switches is assured when switching current polarity in the EMA. This dead zone time is maintained at a fraction of the period for the forward or reverse servo error signal.

In addition to the foregoing features, the circuit of the present invention also provides a reduction in construction and operating costs of an EMA control circuit.

BRIEF DESCRIPTION OF THE DRAWINGS

FIGS. 8a-8f and 9a-9h illustrate coarse and fine mode operation, respectively, of the power driver circuit shown in FIG. 7.

DESCRIPTION OF THE PREFERRED EMBODIMENT

Figure 2:
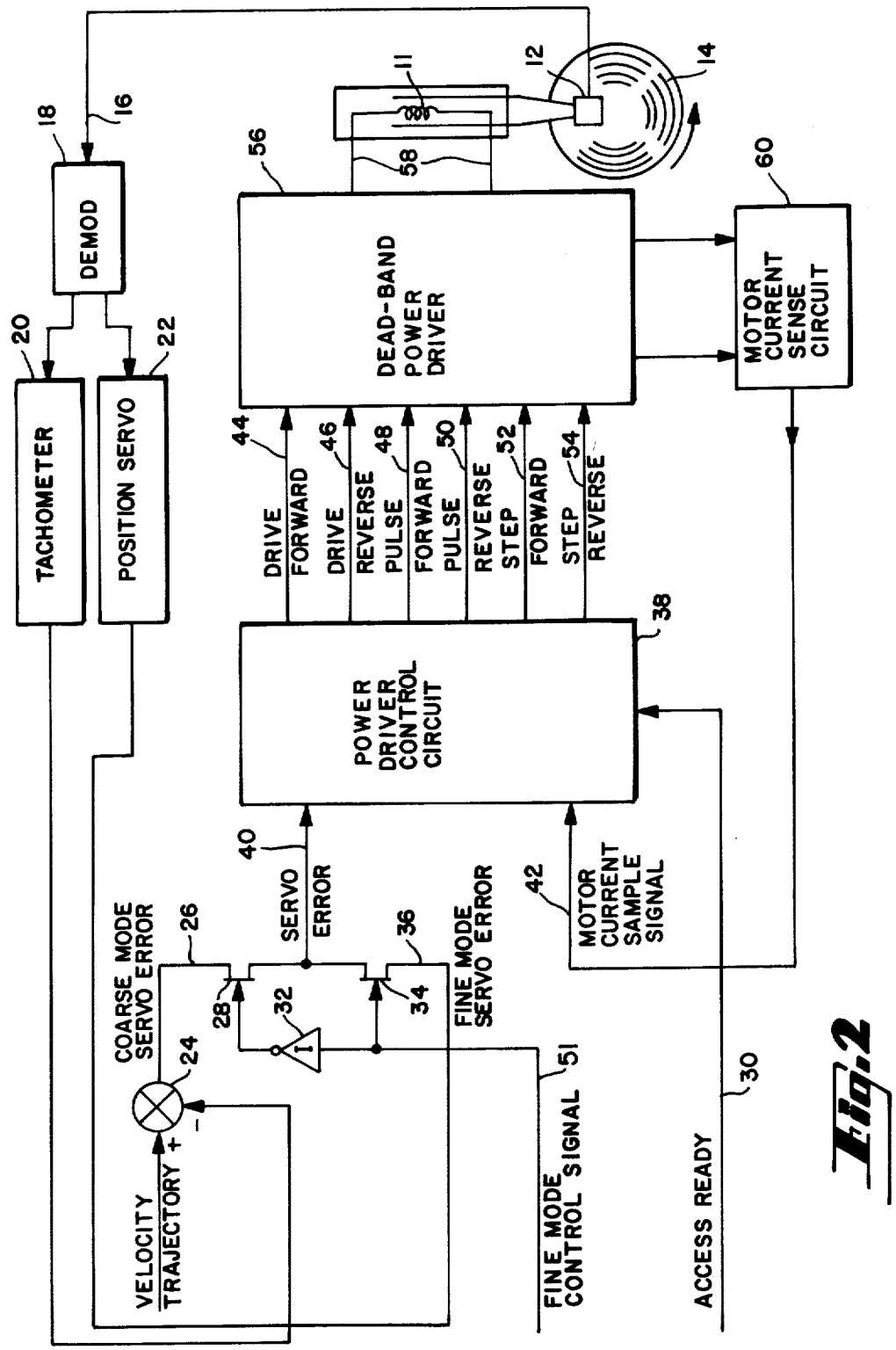
FIG. 2 is a simplified block diagram of the relationship between a power driver control circuit, an EMA power driver circuit and an EMA of the present invention in an exemplary servo system for use in a magnetic disk system of information storage and retrieval.

The block diagram of FIG. 2 shows a servo system for controlling the position of a movable member 12 which carries the servo data readback head with respect to a data storage medium 14 which is a rotating magnetic disk. While the invention is described with reference to magnetic disks and transducers (magnetic recording heads) for reading and writing on such disks, the invention is applicable to analogous servo systems. The servo head of the movable member 12 reads the pre-written servo data and produces output signals in response thereto along line 16 for feeding the data to a servo data demodulator 18 to form the track-following position signal. The output of the demodulator is connected to a tachometer 20 which senses the velocity of radial head movement based upon the detection of such track-following position signal. For example, a scheme is described in U.S. Pat. No. 4,006,394 entitled Coarse and Fine Control for Position Servo by J. Cuda and F. J. Sordello. The velocity signal need not be generated by the position signal derived from the servo data but such is only an exemplary method of generating a tachometer signal. Another method of generating such a signal is by means of detecting actual movement of the head positioning carriage, for example by means of detecting motion of a movable optical grid with respect to a fixed grid, as described in U.S. Pat. No. 3,597,750 entitled Servo with AGC for Positioning a Magnetic Head, granted Aug. 3, 1971 to M. K. Brenner and U.S. Pat. No. 3,999,133 entitled Automatic Gain Control for Transducer Circuit issued Dec. 21, 1976 to S. K. Lee and J. Cuda.

Once a velocity report signal is generated it is fed to the summing junction 24 for comparison with a velocity trajectory which is a pre-determined curve stored as a signal in a circuit and establishes the velocity command for the desired rate of approach to a destination track from another track. Such a velocity trajectory usually provides high initial velocity with braking or deceleration as the destination or desired track is approached. The deviation between the actual velocity and the velocity command trajectory is known as a coarse mode servo error which is a signal taken along line 26 and fed to switch 28. The coarse mode servo error signal on line 26 is only applied when a desired track is being accessed, i.e., in the coarse mode. A mode control signal is transmitted along line 51 and is derived from external logic or analog circuits which identify whether or not a desired track has been reached. When the desired track has not yet been reached the fine mode control signal on line 51 is low so that the signal transmitted to switch 28 is high, by virtue of having passed through inverter 32. This keeps switch 28 closed and switch 34 open. When the fine mode control signal goes high, switch 34 is closed and switch 28 is open. In that instance, switch 34 receives a servo error signal from the position servo system 22 which detects position error of the transducer (servo data head) relative to the center of a data track. Such an on-track system is described in the aforementioned U.S. Pat. No. 3,864,740. The present invention is not restricted to dual mode servo systems, but can also be used in other applications such as phase discriminating system as in U.S. Pat. No. 3,427,606 to R. J. Black and F. J. Sordello or in a limited pulse type of servo system as in U.S. Pat. No. 3,691,543 to F. E. Mueller. The selected output from the switches 28, 34 is transmitted as a servo error signal to the power driver control circuit 38 along the line 40. Another input to circuit 38 is a current sample signal received along line 42. In response to these two input signals, the power driver control circuit produces six output signals, the generation of which is more fully explained with reference to FIG. 3. These output signals taken along lines 44, 46, 48, 50, 52, 54 are respectively known as drive forward, drive reverse, pulse forward, pulse reverse, step forward and step reverse. In general, the drive forward and drive reverse are current steering signals for controlling the direction of current through the EMA 11 and the other four signals are used to control the amount of current through the EMA. The pulse forward and pulse reverse signals are used mainly for coarse mode positioning and to a lesser extent for fine mode positioning, while the step forward and step reverse signals are used exclusively for fine positioning. The signals transmitted along lines 44-54 are only used for operating the transistor switches in the dead-band power driver circuit 56 which supplies the current for powering EMA 11.

The dead-band power driver 56 which receives the control signals along lines 44-54 provides the power for controlling EMA 11 and the construction details of this circuit are more fully described with reference to FIG. 7. The output of the dead-band power driver 56 is taken along lines 58 and provides forward and reverse current to EMA 11. The amount of current in the EMA coil is sampled by a current sensing circuit 60, more fully described with reference to FIG. 7. The output of this motor current sensing circuit is a voltage signal named the motor current sample which is fed back to control circuit 38 so that its magnitude can be compared with the magnitude of the servo error in order to derive those power driver command signals, as further described below.

Figure 3:
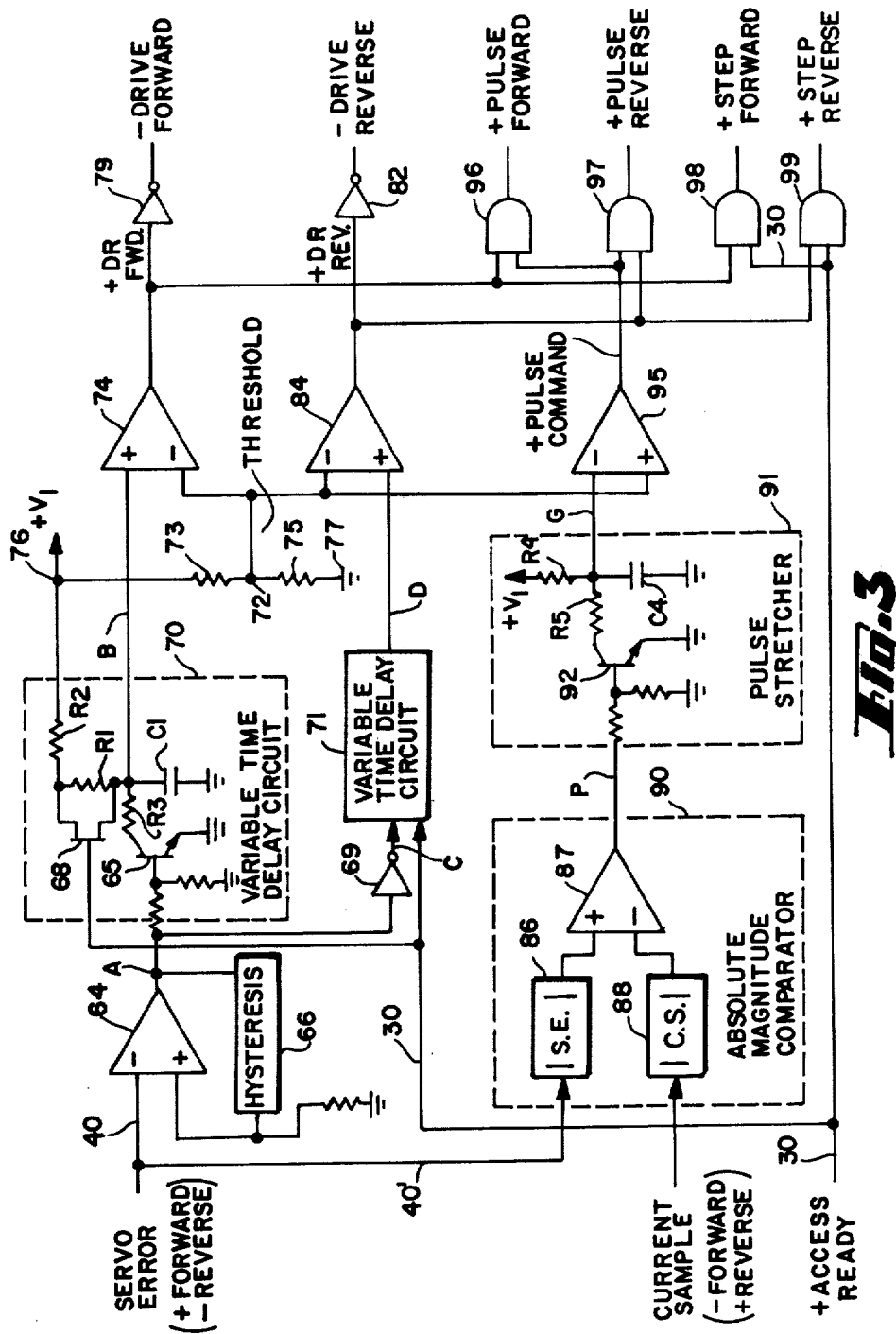
FIG. 3 is a simplified schematic diagram of the power driver control circuit shown in FIG. 2.

FIG. 3 is a simplified diagram of the power driver control circuit 38 shown in FIG. 2. The servo error signal of line 40 is fed to the negative terminal of a voltage comparator 64 which has its positive terminal referenced to ground through a resistor. Output from node A is also fed back to the positive terminal of comparator 64 through a hysteresis circuit 66, which may be a resistor or a passive network to provide rapid voltage changes of node A and enhance noise elimination. The voltage comparator 64 therefore produces a square-wave output in response to the analog servo error signal which may be seen in the top two plots of FIG. 4. It may be seen that a positive servo error which is interpreted as a forward command produces a negative forward command pulse, while a negative servo error is interpreted as a reverse command and produces a positive reverse command pulse at node A. The output from node A is transmitted to the variable time delay circuit 70 which has the resistors R1, R2 and R3, together with capacitor C1 as load members of transistor 65 for forming selected time constants. A field-effect transistor switch 68 allows the bypass of resistor R1 for forming different time constants. With transistor 65 off and switch 68 open across R1, a first long time constant T1 is formed wherein T1=(R1+R2) C1. Another abrupt time constant, T3, is defined approximately by the combination of R3 and C1, i.e., T3 (R3)(C1) when transistor 65 is on. It should be noted that R1 or R2 are very much greater than R3. Switch 68 is controlled by the access ready signal from line 30. When that signal is high, indicating a fine mode operation, switch 68 is closed.

With transistor 65 off at the same time, a different time constant is formed, namely T2 which is equal to the product of R2 and C1, i.e., T2=(R2)(C1) and is shorter than T1. The time constants T1 (or T2) and T3 are chosen, depending on the type of input signal to transistor 65. These time constants are important for forming the dead zones which are used in the present invention. As can be seen, dead zones having different time periods can be selectively formed for both the coarse and fine servo modes. The output of the variable time delay circuit 70 is taken along line B and is shown as the third plot in FIG. 4.

Figure 4:
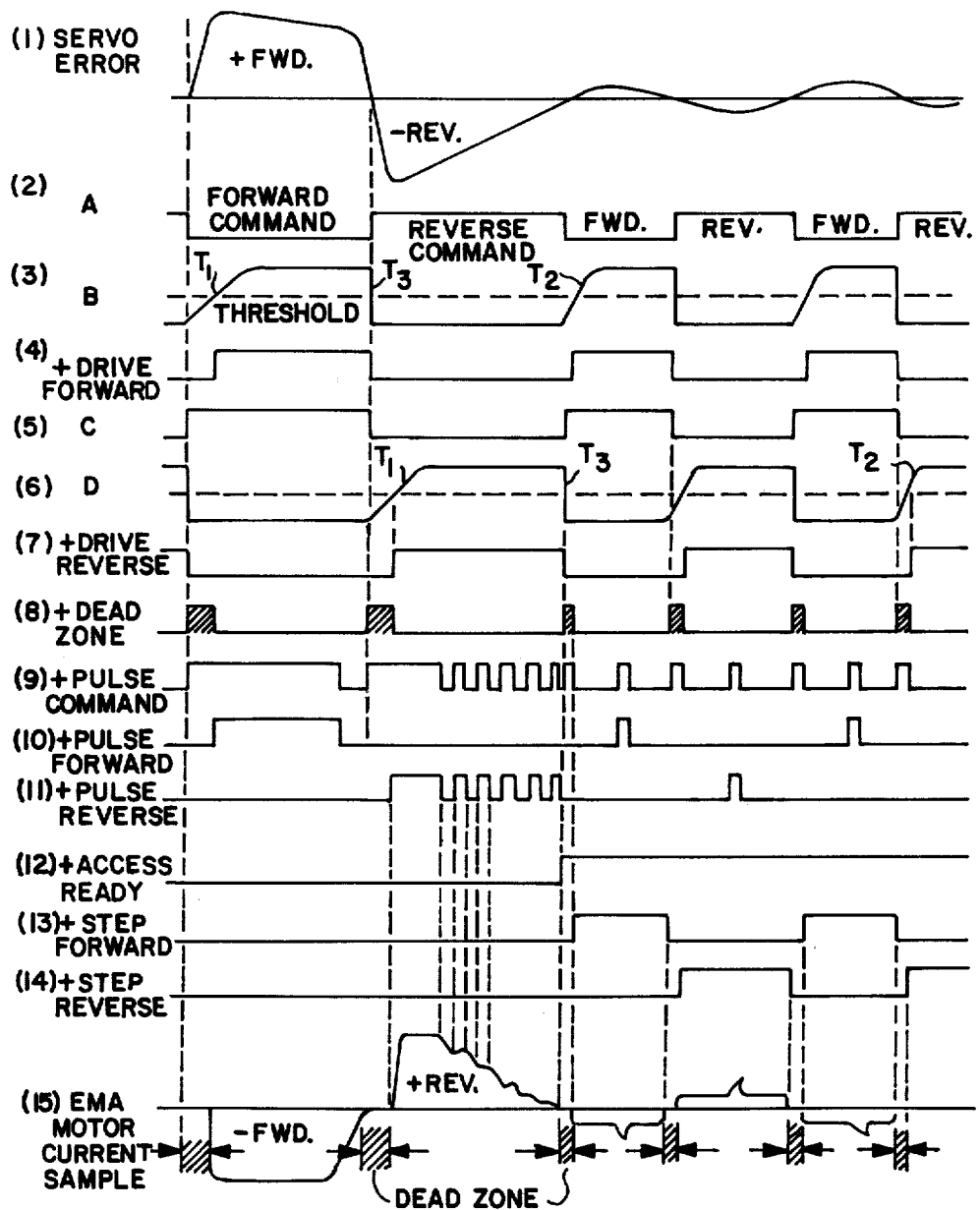
FIGS. 4-6 illustrate waveforms generated and used in the power driver control circuit shown in FIG. 3.

Line B is connected to the positive input of voltage comparator 74, with its negative input referenced to a threshold voltage level at node 72. The voltage level at node 72 is a voltage intermediate to the positive supply V1 at node 76 and ground 77. This threshold voltage is used in conjunction with the time constants T1, T2, T3 to define the dead zone periods and its level may be adjusted by variation of the resistors 73, 75. The threshold voltage level is indicated by the dashed line in the third plot of FIG. 4. This threshold level is used to define dead zones since the output of comparator 74 cannot go positive until the input along line B exceeds the threshold level. Of course, the rate at which the signal along line B approaches the threshold level is defined by the time constants of the time delay circuit 70. The fourth plot of FIG. 4 shows the output of comparator 74, which is termed drive forward. The period of the drive forward signal is shorter than that of the actual forward command by the dead zone. As previously mentioned, this drive forward signal acts as a current steering signal. An inverter, 79, forms a negative drive forward signal for the power driver use.

In parallel with the variable time delay circuit 70 is an identical circuit 71 which receives as an input a signal inverted from the signal in node A by inverter 69. Such a signal as shown in the fifth plot in FIG. 4 exists on line C. The other input to the variable time delay circuit 71 is the access ready signal which exists on line 30 and is used for selecting the time constant T1 or T2 as in the circuit 70. The output of the variable time delay circuit 71 is taken along line D and fed to the positive input terminal of comparator 84, the negative terminal of which is connected to the threshold voltage at node 72. The signal along line D is shown as the sixth plot in FIG. 4. The threshold level is indicated by the dashed line again in the plot. Typically the threshold voltage is set at approximately 63% of the positive supply voltage V1 at node 76. The threshold level again performs the same function as it does for signal B in defining two different dead zone time intervals equal to T1 and T2 approximately at the output of comparator 84 which is called drive reverse and is shown in the seventh plot of FIG. 4. In the plots of the signal levels B and D, the three different time constants T1, T2 and T3 used to define the dead zone time intervals are shown. These time constants generated by the variable time delay circuits 70 and 71 are selected depending on whether an access ready signal is available or not and depending upon whether the servo error signal is rising or falling. In the present system, the coarse mode dead zone is set at 12 microseconds which is only a very small portion of the minimum acceleration or deceleration time of typically one to two milliseconds. The fine mode dead zone is set at 4 microseconds for the best performance during the fine mode interval.

It will be noted in FIG. 4 that the drive forward and drive reverse commands are different from the forward and reverse commands along line A inasmuch as the drive forward and drive reverse commands now include dead zone intervals which are shown in the eighth plot of FIG. 4. These dead zone intervals are times in which all transistor switches in the power driver are open and any current left in the EMA only decays through some switch-bypassing circuit elements. After the dead zone time, a change in direction of current through the EMA results in no damage to any of the transistor switches because the switching sequences of the switches have been well controlled.

Figure 5:
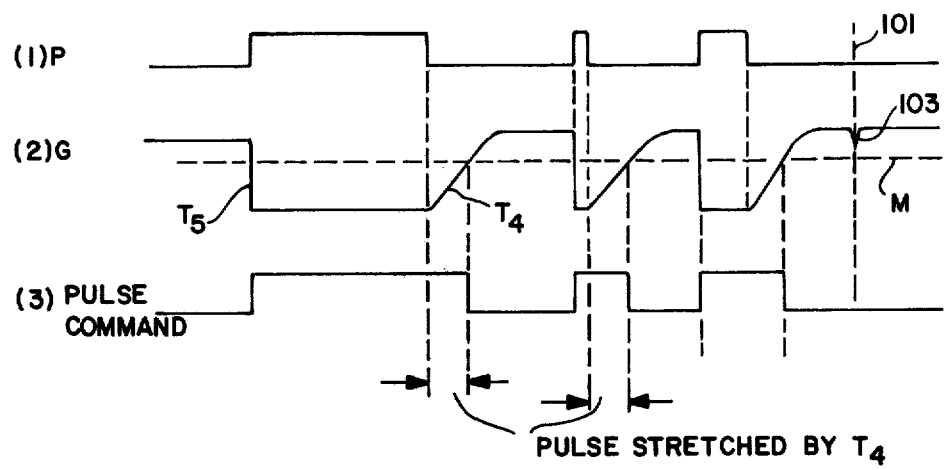

The servo error signal on line 40 is fed to a network 86, which for example may be a diode type rectifier to generate an unidirectional output signal proportional to the magnitude of the input servo error signal with the polarity stripped. The output of network 86 is applied to the positive input terminal of comparator 87, of which the negative input terminal is connected to a network 88 which may also be a diode type rectifier. This network 88, similar to network 86, produces an output signal which is proportional to the magnitude of the motor current sample at its input. The combination of the two networks 86 and 88, together with the comparator 87 form an absolute magnitude comparator enclosed by the dashed line 90. The output of the absolute magnitude comparator 90 is a signal taken along the line P and transmitted to the pulse stretcher circuit which is indicated by the dashed line 91. The output signal along line P shown as the first plot in FIG. 5 is in high state whenever the magnitude of servo error signal is bigger than the magnitude of motor current sample. The pulse stretcher circuit 91 includes a transistor 92 having as its load the time constant elements R4, R5 and C4. The time constants formed by the combination of R4 and C4, R5 and C4 provide for a slow risetime and very fast fall-time at the output of transistor 92 along line G. The signals appearing on line G are shown in the second plot of FIG. 5. With the transistor 92 saturated, the time constant T5 is defined approximately by the product of R5 and C4, i.e., T5 (R5)(C4) under the condition that R4 is much larger than R5. Another time constant T4 defined as the product of R4 and C4, i.e., T4=(R4)(C4) exists when the transistor 92 is open. As can be seen from the second plot in FIG. 5 the T5 fall-time occurring at an upward excursion of the P pulse is brief. In practice, this time period has been established at 200 nanoseconds. On a downward excursion of a P pulse, the G waveform rises slowly and reaches the threshold level indicated by the horizontal dashed line M in FIG. 5 after one time constant period of T4. This time period T4 exceeds the T5 time period by approximately an order of magnitude or greater, and in this case it is set at 2 microseconds.

The output signal G from pulse stretcher circuit 91 in FIG. 3 is fed to the negative input terminal of comparator 95 of which the positive input terminal is connected to the threshold voltage at node 72. Comparator 95 produces a squarewave output termed a pulse command when the signal at G is below the threshold level M. One of the benefits of the pulse stretcher circuit 91 is that very narrow pulses at line P are stretched so that the output of comparator 95 can maintain a minimum pulse width equal to T4. However, any pulse width narrower than half of T5 is not seen. Thus rapid fluctuations attributable to high frequency noise are filtered out by the pulse stretcher circuit 91 where such fluctuations are represented by spikes having a duration less than half of T5. For example, the noise spike 101 on line P in the first plot of FIG. 5, which has a pulsewidth less than half of T5, is converted into the inverted spike 103 on line G in the second plot of FIG. 5. This inverted spike 103 is not detected by the comparator 95 because it is not big enough to cross the threshold M. Therefore any high frequency noise spike is eliminated by the pulse stretcher circuit 91 and does not occur as an output command in the third plot of FIG. 5.

As seen in FIG. 3, the pulse command at the output of comparator 95 are transmitted as inputs to the AND gates 96 and 97. The output of AND gate 96 is termed pulse forward command while the output of AND gate 97 is termed the pulse reverse command. The selection of one or the other of the AND gates 96 and 97 is determined by the current steering commands of drive forward and drive reverse, which come from the outputs of comparators 74 and 84 and are fed as inputs to the AND gates 96 and 97. The pulse forward and pulse reverse commands are shown as the tenth and eleventh plots in FIG. 4. The pulse command waveform which is the third plot of FIG. 5 is shown as the ninth plot of FIG. 4.

The access ready line 30 is connected to another pair of AND gates, 98 and 99 which also receive the current steering commands of drive forward and drive reverse from the outputs of comparator 74 and 84. A high level on the access ready line 30 enables the AND gates 98 and 99, but only one may produce an output since only one of the outputs of comparators 74 or 84 will be high at one time. The outputs from AND gates 98 and 99 are termed step forward and step reverse and appear only in the track following mode after an access ready signal is received. Exemplary step forward and step reverse waveforms are shown as the thirteenth and fourteenth plots in FIG. 4, while the access ready waveform is shown as the twelfth plot. The step reverse and step forward waveforms, as well as the pulse (reverse/forward) command waveform during the fine mode are shown as the first, second and third plots, respectively, of FIG. 6. With reference to FIG. 4, it should be noted that pulse forward and pulse reverse commands occur both before and after an access ready signal is received. In other words, they occur whenever the system needs more EMA current for servo error correction. However, there is no pulse forward or pulse reverse command during the dead zone intervals because the whole bridge is open circuit. On the other hand, the step forward and step reverse waveforms occur only after an access ready pulse has been received. Again there is no step forward or step reverse command signals to the EMA during the dead zone period at which the EMA 11 is designed to be isolated from all the transistor switches of the power driver bridge.

Figure 7:
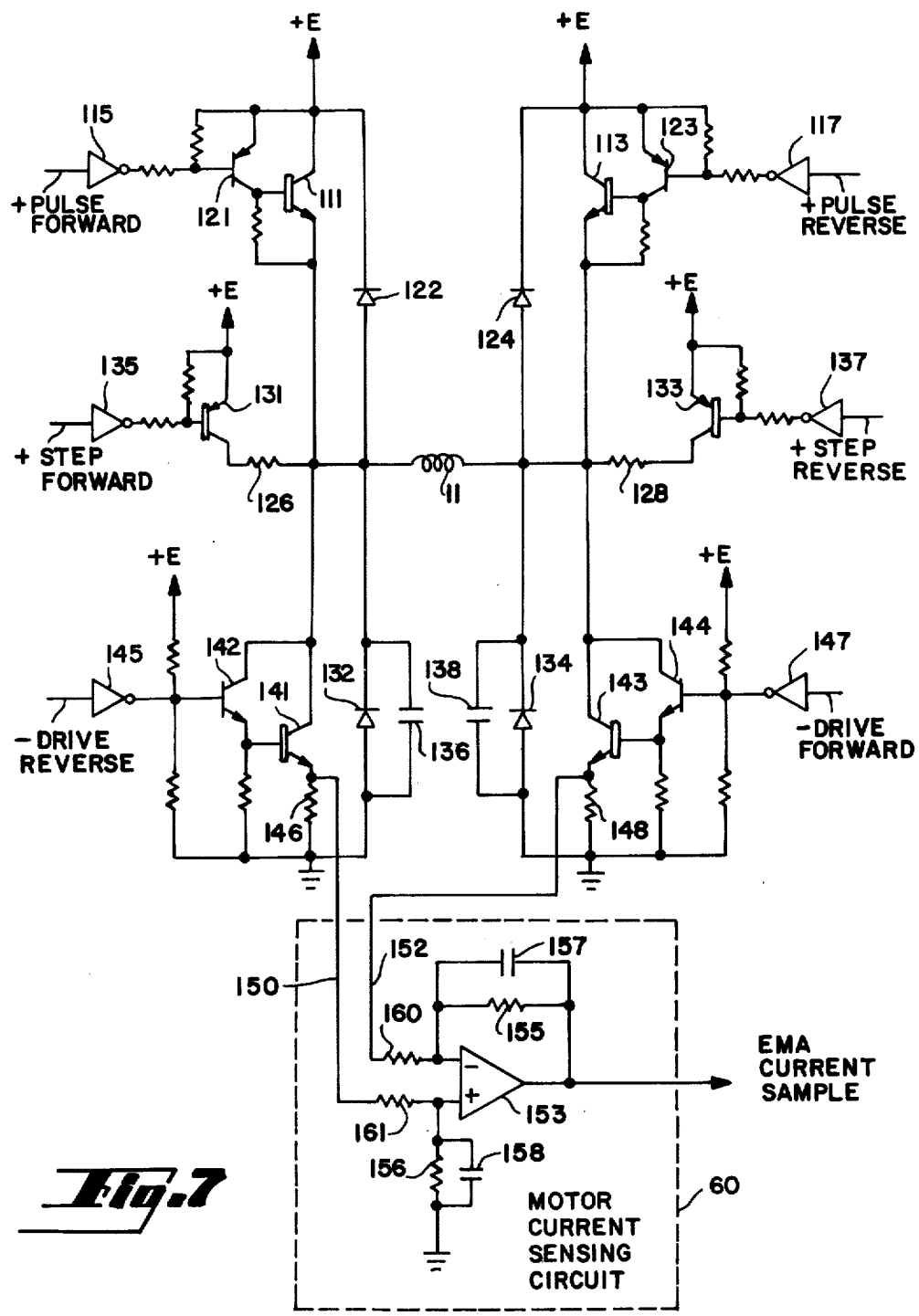
FIG. 7 is a simplified schematic diagram of the power driver circuit shown in FIG. 2.

FIG. 7 shows the power driver of the present invention wherein the six output signals of FIG. 3 are used to control the six transistor switches 111, 113, 131, 133, 141 and 143 after they have been inverted by the inverters 115, 117, 135, 137, 145, and 147 all of which have open collector output circuits to interface with the transistor switches. These six signals are termed pulse forward and reverse, step forward and reverse and drive forward and reverse. The circuit of FIG. 7 is basically a bridge circuit which is vertically symmetrical, similar to the letter H. In some instances, this circuit is known as an H-bridge. The upper arms of the bridge are two pairs of electrically parallel arms. The first pair of arms include the transistor switches 111 and 113 which are responsive to pulse forward and pulse reverse commands respectively applied through the inverters 115 and 117 and the respective auxiliary transistors 121, 123. All the auxiliary transistors are used to enhance the saturation of the respective transistor switches of the bridge that they are connected to. The transistor switches 111, 113 are connected to a positive voltage supply, +E, which can deliver relatively high amounts of current through these transistors to EMA 11.

In parallel with the first switching means formed by transistors 111 and 113 is a second switching means formed by the two transistors 131, 133. The transistors 131 and 133 of the second switching means receive the step forward and step reverse commands through inverters 135 and 137 respectively. The transistors 131 and 133 are both connected to the positive supply, +E. The outputs of these transistors like the output of transistors 111 and 113 are connected to the opposite ends of EMA 11. However two power resistors 126 and 128 are connected between the collectors of the respective transistors 131 and 133, on the one hand, and the EMA 11, on the other hand, as illustrated in FIG. 7. These resistors are rated at a few watts and perform the function of the power resistors 31 and 33 in FIG. 1, except that they dissipate far less power because they carry current only when step forward and step reverse commands are received and the transistors 131 and 133 are conducting. These resistors therefore do not dissipate power at other times.

It should be noted that the pulse forward and reverse switches, 111 and 113 inhibit operation of the step forward and reverse switches 131 and 133 because conduction in the pulse switches swamps out the ability of switches 131 and 133 to conduct. Therefore the step forward and reverse switches remain off, even though there may exist a step forward or step reverse command. The effect of this is to provide three current levels for dead zone operation. First, there is a zero level during the dead zone time interval itself. Second, there is a step forward and reverse level of constant current generated through the step forward and reverse transistors 131 and 133. Third, there are current pulses which override the step forward and reverse currents when the pulse forward and reverse transistors 111 and 113 are activated. These three current levels may be seen in the four plots of FIG. 6, previously described.

The lower arms of the bridge shown in FIG. 7 are formed by the symmetrically opposed transistor switches 141 and 143. These switches receive the respective input commands of drive reverse and drive forward through the inverters 145 and 147 and serve to steer current through EMA 11 in one direction or the other. The transistors 141 and 143 are connected to the auxiliary transistors 142, 144 respectively for saturation enhancement. The emitters of these switching transistors 141 and 143 are connected to the respective motor current sensing resistors 146, 148 through which voltage signal can be developed to represent the current passing through the EMA 11. Typically, these resistors are very low value resistors, such as one ohm which permit currents in both lower arms of the bridge circuit to be sampled and transmitted as inputs to the EMA current sensing circuit 60. These current samples taken along the lines 150, 152 are summed by an operational summing amplifier 153 with an active low pass filter characteristic to smooth them out. The filter network is formed by the resistors 155, 156, 160, 161, the capacitors 157, 158 and the summing amplifier 153. As a result, the output of the current sensing circuit 60 is the EMA current sample voltage signal which in this invention is obtained by sensing the two unidirectional currents in the current sensing resistors 146 and 148 as opposed to the prior art. The prior art current sampler was connected across the current sensing resistor in series with the EMA wherein current could flow in either direction, therefore a more sophisticated current sensing circuit than in the present invention was required.

Figure 6:
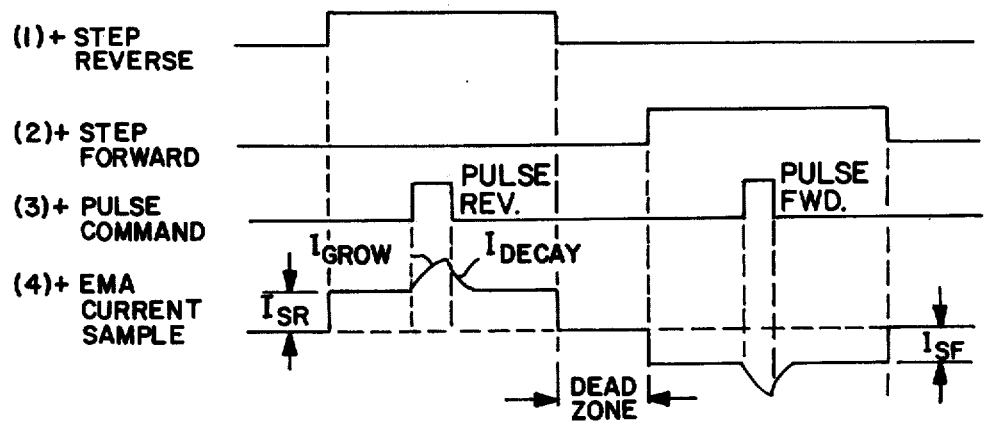

The power resistors 126 and 128 in the upper arms of the bridge circuit enable limited current and thus limited power to be delivered to the EMA from the transistor switches 131 and 133 relative to switches 111 and 113, which do not have similar power resistors connected thereto. The reason for this is that the constant current to be delivered to EMA 11 during step forward and step reverse commands is much smaller than the current delivered during the time when pulse forward and pulse reverse commands are activated. Note that the step forward and step reverse commands occur only after an access ready command, implying that the servo system is in a track following mode and only small servo error corrections are needed. On the other hand, when a pulse forward or pulse reverse command is applied by itself, larger amounts of current are usually needed when the servo system is in the coarse mode or when the servo system requests more EMA current in addition to the constant current during the fine mode in order to cope with the servo error. FIG. 6 shows how the step reverse and step forward commands, as well as the pulse (reverse/forward) command affect an EMA current sample detected by the EMA current sensing circuit 60. The pulse command signal is combined with the step commands to define the proper amount of EMA current needed by the system and displayed in the EMA current sample. Note that the current sample in the fourth plot of FIG. 6 preserves the dead zone between the step reverse and step forward commands. Plot 15 in FIG. 4 shows an EMA current sample transmitted as an output from the motor current sensing circuit 60. A relatively long pulse forward command generates the saturated amount of EMA forward current for maximum constant acceleration while a series of shorter pulse reverse commands show up as a stepped current sample to regulate the amount of EMA current in correcting the servo error during deceleration. This is followed by current samples having a smaller magnitude, $I_{SR}$ and $I_{SF}$, which are symmetrically above and below the zero current level and correspond to step reverse and step forward commands as shown in more detail in FIG. 6. Whenever the pulse forward or the pulse reverse command is activated, the current sample $I_{SF}$ or $I_{SR}$ grows respectively to a larger magnitude to correct the servo error until the pulse command is removed to imply that the EMA current is more than necessary. Then the EMA current will decay back to the constant current level.

The reason that the pulse command shown in the ninth plot of FIG. 4 is active for the whole drive forward period but on and off during the reverse period of the coarse mode of operation is that the exemplary system for which the present invention is described relies on the forward servo error to produce maximum acceleration to the transducer until the tachometer output catches up the velocity trajectory to generate the reverse servo errors for deceleration or braking. In order to avoid overshoot when approaching the desired servo track, deceleration power is switched on and off by means of switching on and off the pulse reverse command to regulate the amount of EMA current, and thus the speed of the transducer until a desired track is reached. The result is slower decleration, but with a minimum amount of overshoot. Moreover, the switching on and off of the pulse command in addition to the relay mode with dead zone control of EMA current during on track or fine mode of operation yields an excellent result in controlling the position of the transducer above the center of the data track.

The bridge defined by the symmetrically opposed, paired, transistor switches has a left side which includes the switches 111, 131 and 141. Opposite this side is a right side which includes the switches 123, 133 and 143. The EMA 11 is connected between the left and right side switches. Within the bridge formed by the aforementioned transistor switches, is another bridge formed by diode circuit elements. This bridge has left hand side bridge members 122, 132 and right hand side bridge members 124, 134. These circuit elements serve to bypass the switches under certain operating conditions, as will be seen below. One important time when the diodes bypass the switches is during a dead zone time interval. The diodes not only bypass the switches, but also the current sensing resistors 146 and 148 so that during a dead zone, zero current is reported to the current sensing circuit 60. The output of circuit 60 is the output of the summing amplifier 153, a single unidirectional current sample signal.

FIGS. 8a-8f and 9a-9h explain the operation of the circuit of FIG. 7. Any transistor switch that is not drawn in FIGS. 8 and 9 is an open circuit. Those two capacitors 136 and 138, shown in FIG. 7 and not drawn in FIGS. 8 and 9, are used as those two capacitors 53 and 55 in FIG. 1 to suppress the reverse recovery current of diodes 132 and 134 and minimize the noise spike due to the back electromotive force of the EMA coil whenever the motor current decays during pulsing or dead zone period. In particular, FIGS. 8a-8f describe operation during coarse mode. With respect to FIG. 8a during a pulse forward command, the pulse forward transistor switch 111 is closed, so as the drive forward switch 143. This results forward current to flow in the direction indicated by the dashed line $I_F$. Current through the EMA 11 is sensed by the 1 ohm resistor 148. The current through the EMA, $I_F$, tries to grow to the saturation level defined by the power supply, E, and the total series resistance in the current path. This forward current initially applied to the coil implies an acceleration condition for the actuator. The forward current $I_F$ saturates for constant acceleration until the servo error signal changes polarity to imply that braking or deceleration is needed to reach a desired track.

Figure 8C:
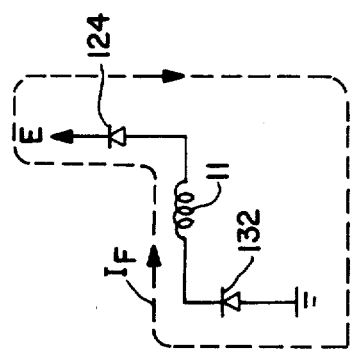
Figure 8F:
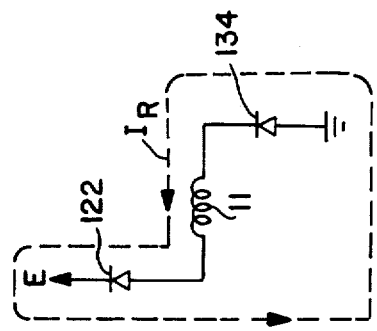
Figure 8B:
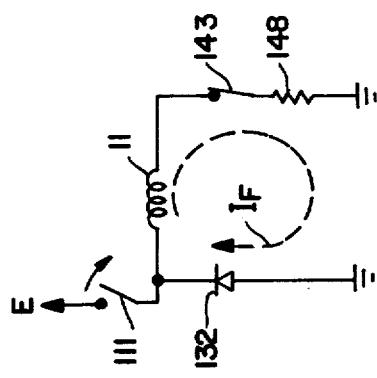

At the end of the pulse forward command, but while there is still a drive forward command signal, transistor switch 111 is opened as shown in FIG. 8b. The transistor switch 143 is still conducting, and a complete circuit for the residual current $I_F$ in the EMA to decay is provided through diode 132 which bypasses transistor 141. However, as the forward servo error signal changes to a reverse servo error signal, a dead zone is created in accord with the teachings of the present invention. This means that all transistor switches are open and creates the current flow situation shown in FIG. 8c where the current in the EMA now decays towards zero through the diodes 132 and 124.

Figure 8E:
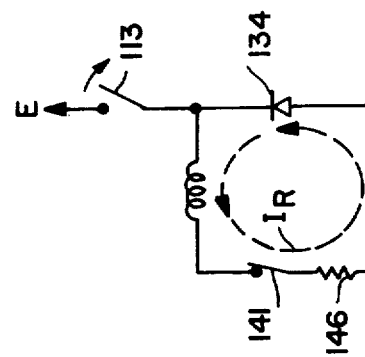
Figure 8A:
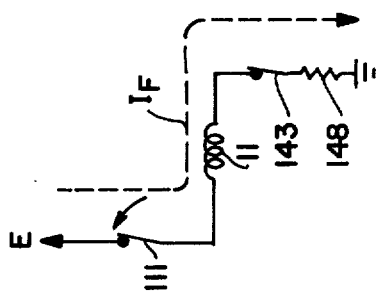
Figure 8D:
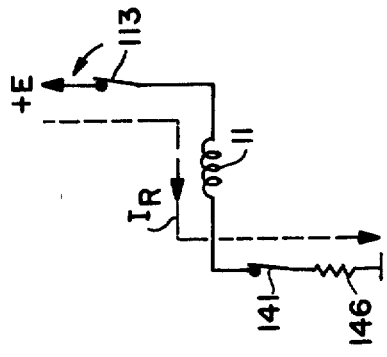

In FIG. 8d, both the transistor switches 113 and 141 are closed to provide a current path for the reverse current $I_R$ to flow through the EMA 11 and the current sensing resistor 146. The drive reverse command keeps transistor switch 141 closed all the time during deceleration while the intermittent pulse reverse command keeps switch 113 intermittently closed to adjust the amount of reverse current in the EMA.

In those situations where switch 113 is open, the situation shown in FIG. 8e exists with reverse current decaying through diode 134 instead of flowing through transistor switch 113. This is a current decay mode, since the power supply voltage E is disconnected from the EMA by means of the open transistor switch 113.

In FIG. 8f, decay of the EMA current $I_R$ is completed through diode 122 and 134. This situation occurs after the occurrence of a dead zone which forces the opening of transistor switch 141 in FIG. 8e, the only switch which was closed. Thus, it is seen how the drive forward and drive reverse commands, as well as the pulse forward and pulse reverse commands activate transistor switches during coarse mode operation.

FIG. 9 shows the operation of the circuit of FIG. 7 during the fine mode. In FIG. 9a a step forward command closes transistor switch 131, while a drive forward command closes transistor switch 143. This causes the step forward current $I_{SF}$, of which the magnitude is mainly defined by the resistance of the power resistor 126 according to the on-track servo requirement, to flow through EMA 11 and the current sensing resistor 148 to ground.

Figure 9A:
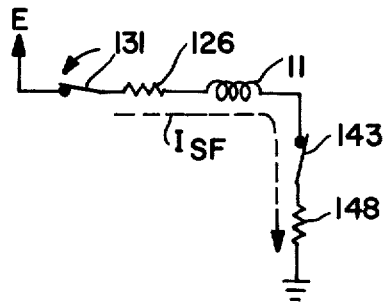
Figure 9B:
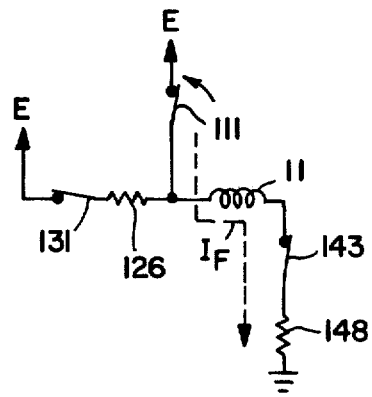
Figure 9C:
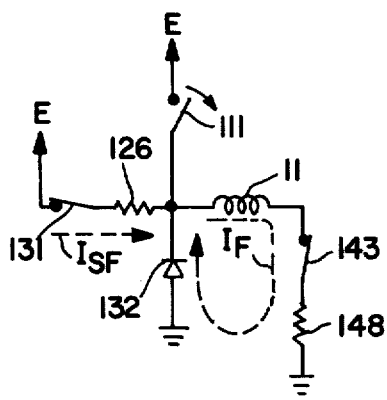
Figure 9D:
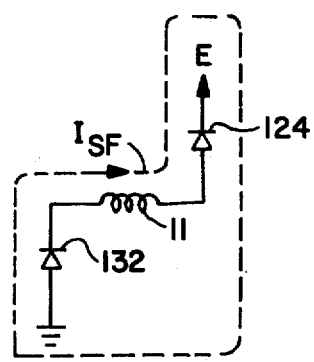

Whenever the servo error exceeds the step forward current, $I_{SF}$, the situation illustrated in FIG. 9b occurs. Pulse forward commands are being generated to close switch 111 and generate a bigger current $I_F$, which shuts off the transistor 131 and thus the step forward current $I_{SF}$ until the servo error is smaller than the EMA current as measured by absolute magnitude comparator 90 in FIG. 3. At that point, the pulse command drops and the switch 111 is open again. The EMA current $I_F$ then decays as shown in FIG. 9c through resistor 148 and diode 132. Current $I_F$ decays until it reaches the amplitude of the current $I_{SF}$ supposed being supplied through transistor switch 131, then the transistor switch 131 conducts again and the EMA current stays at $I_{SF}$.

When the servo error changes polarity, this is detected by the voltage comparators 74 and 84 in FIG. 3. When the dead zone time interval occurs with all transistor switches turned off, the situation shown in FIG. 9d results. The step forward current decays through diodes 132 and 124 bypassing the corresponding transistor switches for current flow during the dead zone interval.

After this interval has elapsed, the situation shown in FIG. 9e occurs. Transistor switch 141 which receives the drive reverse command is closed and the transistor switch 133 is also closed by a step reverse command. This allows current $I_{SR}$ to flow from the positive supply through the transistor switches 133, 141, the power resistor 128, EMA 11 and the current sensing resistor 146 to ground.

When the magnitude of the servo error exceeds the magnitude of the constant EMA current sample, transistor switch 113 receiving the pulse reverse command closes and the transistor switch 133 is forced to be nonconducting. This results in a greater amount of current from the positive supply E to flow through EMA 11, transistor switch 141 and current sensing resistor 146 to ground. When the magnitude of the servo error is less than the magnitude of the EMA current sample, the pulse reverse command ceases and transistor switch 113 opens as shown in FIG. 9g. This causes a decay of the reverse current $I_R$ through diode 134, EMA 11, transistor switch 141 and resistor 146 until the step reverse current $I_{SR}$ takes over again as the dominant current through EMA as explained before.

On change of polarity of the servo error, a dead zone is created again. This causes the opening of all transistor switches and a decay of the step reverse current, $I_{SR}$, through diodes 134, EMA 11 and diode 122.

Figure 1:
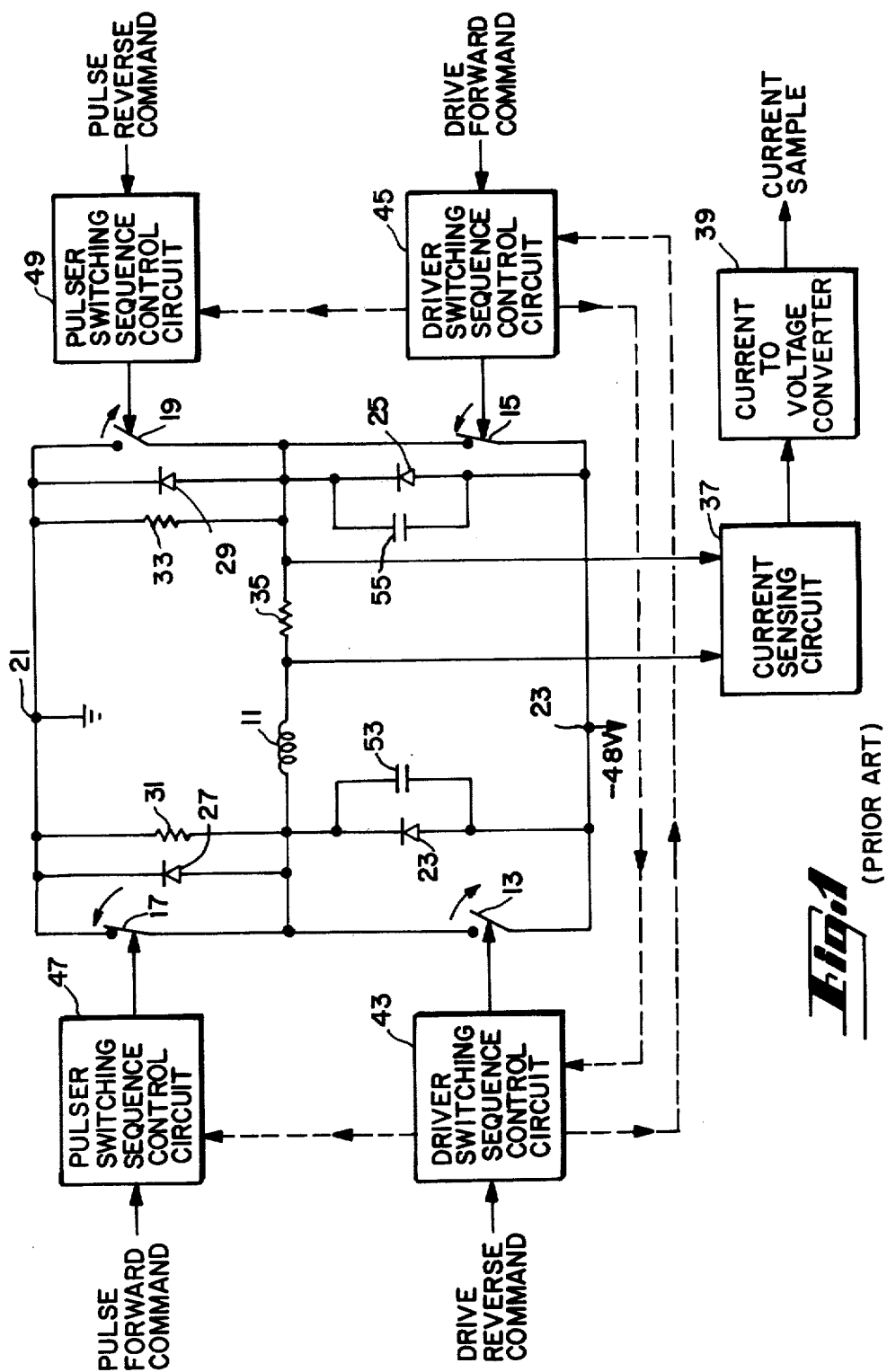
FIG. 1 is a block diagram of a prior art power driver for an electromagnetic actuator (EMA).

In summary, by providing separate switches for pulse forward and pulse reverse commands on the one hand and step forward and step reverse commands on the other hand, there is an opportunity for isolating the power resistors 126 and 128 during the coarse mode because they are not needed except during on-track or fine mode operation. The control circuit of the present invention provides commands for driving these separate transistors at the appropriate time, without the need for sequencing circuits. The sequencing circuits of the prior art, as shown in FIG. 1, have been eliminated by providing dead zone time periods at the transition of the polarity of the servo error signal.

What is claimed is:

1. A power driver for use in a servo system comprising, an electromagnetic actuator (EMA) of the type applying force to a movable member by means of forward and reverse current supplied to the EMA corresponding to forward and reverse servo errors, switching means for applying greater amounts of forward and reverse current to an EMA curing coarse servo corrections and lesser amounts during fine servo corrections, and control circuit means, having an output connected to said switching means and connected to receive a servo error signal as one input and an actuator current sample signal as another input, the two inputs electrically combined for temporarily isolating said switching means from the EMA upon transitions in polarity of the servo error signal by opening said switching means for a selected dead zone time interval, thereby preventing switching means burn-out.

2. The power driver of claim 1 wherein said control circuit means includes a variable time delay circuit having plural, selectable, delay elements for establishing the preselected dead zone time interval.

3. The power driver of claim 1 wherein said control circuit means includes two variable time delay circuits, each variable time delay circuit associated with an opposite polarity of said servo error signal, each delay circuit having plural, selectable, delay elements for establishing the preselected dead zone time interval.

4. The power driver of claim 1 wherein said control circuit means includes an absolute magnitude comparator having as inputs the magnitude of the servo error signal and the magnitude of a sample of EMA current and having as an output a pulse command whenever the servo error signal exceeds the EMA current.

5. The power driver of claim 1 wherein a pulse stretching circuit means is connected to said absolute magnitude comparator for stretching the pulse width of said output pulse commands for providing minimum duration pulses.

6. The power driver of claim 1 further defined by current decay means connected in parallel with said switching means for providing a current path to ground during dead zone time intervals.

7. The power driver of claim 1 wherein said switching means includes step forward and reverse switches disposed on opposite sides of the EMA for feeding current to the EMA only during said fine servo corrections, said switches each having a power resistor connected thereto through which current flows only during fine servo corrections.

8. The power driver of claim 7 wherein said switching means further includes drive forward and reverse switches, as well as pulse forward and reverse switches, said forward and reverse switches disposed on opposite sides of the EMA and connected to logic gates in said control circuit means, said drive forward and reverse switches disposed to steer the direction of current through the EMA.

9. The power driver of claim 7 wherein said control circuit means has an access ready input receptive of a fine servo signal for enabling said step forward and reverse switches.

10. The power driver of claim 8 wherein a pair of current sensing resistors are connected on one side to said drive forward and reverse switches and to said EMA and on the opposite side to ground for sampling of EMA current.

11. The power driver of claim 8 wherein said step forward and reverse switches, said drive forward and drive reverse switches and said pulse forward and pulse reverse switches are symmetrically paired and arranged in a bridge about said EMA, said pulse forward and reverse switches arranged to inhibit said step forward and reverse switches independently of commands from said control circuit means.

12. The power driver of claim 10 wherein a plurality of circuit elements are connected to said EMA between said EMA and said current sensing resistors, said circuit elemnts arranged to define a current path to ground for EMA current during dead zone time intervals, bypassing said current sensing resistors, whereby said current sensing resistors sense zero current during a dead zone time interval.

13. The power driver of claim 10 wherein said current sensing resistors are each connected to a current sensing circuit wherein current from said current sensing resistors is summed, said current sensing circuit having an output carrying a unidirectional EMA current sample signal.

14. The power driver of claim 3 wherein each variable time delay circuit is connected to receive a signal indicating fine mode servo operation, said fine mode signal activating one time delay and the absence of said fine mode signal activating another time delay.

15. In a position servo system, a control circuit for a power driver used with an electromagnetic actuator (EMA) of the type wherein amounts and polarities of control current are fed through a plurality of switches arranged in a bridge with opposed bridge arms and the EMA therebetween, comprising, a variable time delay circuit, connected to receive a servo error signal as an input and produce a delayed servo error signal, current sensing means communicating with the EMA for obtaining a current signal therefrom, comparator means connected to receive the servo error signal and the current sample signal, said comparator means connected to a pulse stretching circuit for producing a stretched comparator difference signal and logic means connected to switches in a power driver combining the delayed servvo error signal and the stretched comparator difference signal for deriving control signals having selectable dead zone intervals, temporarily isolating said switches from the EMA upon transitions in polarity of the servo error signal by opening said switches for a selected dead zone time interval, thereby preventing switch burn-out, said time delay circuit having plural, selectable, delay elements for establishing selected dead zone time intervals.

16. The control circuit of claim 15 wherein said control circuit further comprises a second variable time delay circuit, each circuit of the first and second variable time delay circuits associated with an opposite polarity of said servo error signal, each variable time delay circuit having plural, selectable, delay elements for establishing the preselected dead zone time interval.

17. The control circuit of claim 15 further comprising an absolute magnitude comparator having as inputs the magnitude of the servo error signal and the magnitude of a sample of EMA current and having as an output a pulse command whenever the servo error signal exceeds the EMA current.

18. The control circuit of claim 17 wherein a pulse stretching circuit means is connected to said absolute magnitude comparator for stretching the pulse width of said output pulse commands for providing minimum duration pulses.

19. A power driver control circuit for providing correction currents to an electromagnetic actuator comprising,
  bridge circuit means including a plurality of switches in different bridge circuit arms, said bridge circuit means connected across an electromagnetic actuator for providing bidirectional amounts of current through the actuator in response to a bipolar servo error signal,
  current sensing means communicating with said actuator for obtaining a current sample signal from the actuator,
  comparator means connected to receive the servo error signal and to receive the current sample signal, said comparator means connected to a pulse stretching circuit for producing a stretched comparator difference signal,
  a time delay circuit means connected to receive the servo error signal for producing delayed servo error signal, and
  logic means controlling operation of the switches in the bridge circuit, said logic means for electrically combining the delayed servo error signal and the stretched comparator difference signal thereby deriving control signals having selectable dead zone intervals between changes in servo error signal polarity, wherein said switches in the bridge circuit means remain open during selected dead zone intervals.

20. The control circuit of claim 19 wherein said logic means comprises a plurality of comparator circuits referenced to a common threshold and a plurality of connected logic gates arranged to provide coarse and fine control signals separated by said selected dead zone intervals.

21. The control circuit of claim 19 wherein said comparator means includes absolute magnitude inputs for receiving the absolute magnitude of the servo error signal and the absolute magnitude of said current sample.

22. The control circuit of claim 19 wherein said time delay circuit includes means for varying the delay of said time delay circuit.

23. The control circuit of claim 19 wherein said pulse stretching circuit comprises a time delay network with time constants providing a slow rise time and a very fast fall time for pulses through the circuit.

24. The control circuit of claim 22 wherein said time delay circuit means comprises two variable time delay circuits, each variable time delay circuit associated with an opposite polarity of the bipolar servo error signal, each delay circuit having plural, selectable, delay elements for establishing the extent of delay depending upon coarse or fine servo error signals.

25. The control circuit of claim 19 wherein said current sensing means comprises a pair of current sensing resistors on opposite sides of the actuator and connected circuit means for bypassing said current sensing resistors during dead zone intervals, whereby said current sensing resistors sense zero current during dead zone intervals.

26. The control circuit of claim 25 wherein said current sensing resistors are connected to a current sensing comparator having a unidirectional current sample output.

27. A control method of providing correction currents to an electromagnetic actuator employing a circuit transmitting current to the actuator, the circuit having switches which are openable and closable to direct current to and from the actuator comprising,
  sensing current in an actuator and obtaining a current sample signal,
  sensing a servo error signal intended to direct correction currents to the actuator,
  comparing the current sample signal with the servo error signal and deriving a stretched difference signal proportional to the amount that servo error signal exceeds the current sample signal,
  providing a variable time delay for the servo error signal thereby obtaining a delayed servo error signal, and
  electrically combining the delayed servo error signal and the compared, stretched difference signal to produce switch control signals having selectable dead zone intervals between changes in servo error signal polarity, in which all switches are open.

28. The control method of claim 27 further defined by obtaining the absolute value of both the current sample signal and servo error signal prior to comparison.

29. The control method of claim 27 further defined by establishing the extent of the variable time delay depending upon coarse or fine servo error signals.

30. The control method of claim 27 further defined by sensing the current sample signal in current sensing resistors and bypassing said current sensing resistors during dead zone intervals, whereby said current sensing resistors sense zero current during dead zone intervals.

* * * * *